2,976,219
METHOD FOR INCREASING THE PRODUCTION OF STARCH-HYDROLYZING ENZYMES

Koichi Yamada, RA24 Honcho-dori, Nakano-ku, Tokyo, Japan

No Drawing. Filed Aug. 3, 1959, Ser. No. 831,025

8 Claims. (Cl. 195—62)

My invention relates to a method of producing improved yields of starch-hydrolyzing enzymes by the fermentation of nutrient media, and more particularly, it relates to the production of starch-hydrolyzing enzymes by the fermentation of saccharides in the presence of phytic acid or salts thereof.

The production of starch-hydrolyzing enzymes has been accomplished in the past by the fermentation of starch-containing nutrient media containing different forms of nitrogen sources and, as needed, small amounts of inorganic salts using either surface culture or submerged culture methods. For example, strains of the genus Aspergillus have been cultured in media containing starch and a nitrogen source, such as nitrite, nitrate, aspartic acid, asparagine or urea, and a small quantity of inorganic salts. Occasionally, vitamins, steroids, hormones, amino acids, organic acids or inorganic acids have been added to culture media, such as the above, for increasing the yields of the starch-hydrolyzing enzymes.

I have now discovered that the yields of starch-hydrolyzing enzymes obtainable by previously known methods can be materially increased by including in the fermentation media a small quantity of phytic acid or the salts thereof.

My improved process for the production of starch-hydrolyzing enzymes has the added advantage of permitting the substitution of various saccharides for the starch used in the prior art processes. I have discovered that even in media not containing starch, very potent starch-hydrolyzing enzymes can be produced in a short time if the fermentation is carried out under conventional methods in the presence of phytic acid or salts thereof using as a source of carbon a variety of saccharides such as the monosaccharides, glucose, fructose, mannose, galactose, etc.; and disaccharides, such as maltose, sucrose, lactose, etc.; and that even in media containing starch as the carbon source the production of starch-hydrolyzing enzymes is markedly augmented.

In carrying out my process for the production of starch-hydrolyzing enzymes, I can use any of the starch-containing culture media of the prior art, or similar culture media in which the starch has been substituted in whole or in part by a saccharide or mixture of saccharides. If starches are used as the source of the carbon, it can be used in either the form of pure or crude starches of any conventional source, such as grains or potatoes; or in place of the pure starches, I can use starch-containing materials such as potatoes or cereals in suitably comminuted form. Suitable cereals include maize, wheat, oats, etc. Similarly, I can use either a pure saccharide of the type set forth above or a saccharide-containing material, such as, for example, beet or cane molasses, crude dextrose syrup, etc.

The remaining composition of the media will vary somewhat depending upon the particular carbon source employed and its degree of impurity, the crude carbon-containing materials usually including some or all of the other nutrient materials required for a satisfactory fermentation. It is generally necessary, however, to add small amounts of additional nutrient materials in order to obtain optimum fermentation, as for example, inorganic nitrogen sources, such as ammonium nitrate, sodium nitrate and the like; organic nitrogen sources such as cornsteep liquor, urea, etc.

I have now discovered that by adding to either the culture media of the prior art containing starch as the sole carbon source, or similar media in which a saccharide is substituted in part or in whole for the starch, an amount of phytic acid or a salt thereof in an amount ranging from 0.01% to 0.1%, the yields of starch-hydrolyzing enzymes are markedly increased over any obtainable by any prior art method. When used in the salt form, I can use any non-toxic salt of phytic acid. For most purposes, however, I have found it preferable to use salts such as sodium phytate, potassium phytate, calcium phytate, barium phytate, magnesium phytate, and the like.

The culture media used in my process is prepared by mixing the various ingredients thereof, including the phytic acid or salt thereof, in any conventional manner, followed by sterilization with steam under pressure, using conventional methods. The sterilized medium so obtained is then inoculated with a starch-hydrolyzing filamentous fungus such as for example, *Aspergillus oryzae*, *Aspergillus awamori*, or *Rhizopus javanicus* or with starch-hydrolyzing producing bacilli, such as, for example, *Bacillus subtilis*, and then cultivated under conventional methods, such as shaking, aeration, or agitating aeration at temperatures of the order of 30° C. in the case of fungi, and of the order of 37° C. in the case of bacteria. A notable growth of mycelia appears in about two days' time after inoculation and the production of starch-hydrolyzing enzymes reaches a maximum within three to four days' time after inoculation.

The starch-hydrolyzing enzymes so produced are recovered by any conventional method.

The enzymes produced in accordance with my invention exhibit dextrinogenic amylase and saccharogenic amylase activities in high concentrations. The potency of the dextrinogenic amylase and saccharogenic amylase can be estimated in the following manner.

I. QUANTITATIVE ESTIMATION OF DETRINOGENIC AMYLASE

Place 20 ml. of 2% soluble starch solution into a 100 ml. flask and add 2 ml. of acetate buffer solution (pH 4.8). Next add 2 ml. of a solution containing the starch-hydrolyzing enzyme (dextrinogenic amylase) at 30° C., mix the ingredients and calculate the time (expressed in minutes) required for the iodine reaction to disappear. The higher the potency, the lower the numerical value.

II. QUANTITATIVE ESTIMATION OF SACCHAROGENIC AMYLASE

Place 20 ml. of 2% soluble starch solution into a 100 ml. flask and add 2 ml. of acetate buffer solution (pH 4.8). Then add 2 ml. of a solution containing the saccharogenic amylase at 30° C. to the mixture so obtained. To estimate quantitatively reducing sugar formed by the saccharogenic amylase in the mixture, a sample of the solution is immediately taken and analyzed by Somoygi's method. Additional samples are taken at thirty minute intervals and similarly analyzed. From the value so obtained, the potency of saccharogenic amylase is determined by the following formula:

Potency of saccharogenic amylase $$= \frac{\text{reduced sugar produced (mg.)}}{\text{total sugar (mg.) in the mixture}} \times 100$$

In this case, the higher the numerical value, the greater the potency.

The following examples will serve to illustrate my invention. It is understood, however, that I do not intend to be limited to the components, temperatures, proportions, etc., set forth, but rather it is intended that all equivalents obvious to those skilled in the art be included within the scope of my invention.

*Example I*

A medium containing a monosaccharide (2–5%), ammonium nitrate (0.5%), disodium hydrogen phosphate (0.1%), potassium chloride (0.05%), and magnesium sulfate (0.05%) was prepared. To one series of 500 ml. Erlenmeyer flasks each containing 100 ml. of this medium calcium phytate (0.01%) was added. To the other series of flasks containing the medium, no calcium phytate was added.

The pH of each series of flasks was then adjusted to 5.0 with hydrochloric acid. After sterilization for 15 minutes with steam at a pressure of 15 lbs. and cooling, each flask was inoculated with a very small amount of spores of *Aspergillus niger* NRRL 337 and fermentation permitted to take place at a temperature of about 30° C. on a shake table operating at a speed of about 240 r.p.m. One gram of sterilized calcium carbonate was added to each flask 24 hours after inoculation, or as needed, to keep the pH of the fermenting medium within the range 4–7. Starch-hydrolyzing enzymes having the highest potency were obtained after incubation for 3–4 days.

Results obtained with four monosaccharides, with and without added calcium phytate, are shown in Table I.

TABLE I

| Monosaccharides used | Calcium Phytate | Incubation Period, Days | pH | Dextrinogenic Amylase Activity | Saccharogenic Amylase Activity |
|---|---|---|---|---|---|
| Glucose | Not added | 2 | 5.8 | 30< | 0.4 |
|  |  | 3 | 5.5 | 30< | 0 |
|  |  | 4 | 5.5 | 30< | 1.5 |
|  |  | 5 | 5.5 | 30< | 2.1 |
|  | Added | 2 | 6.0 | 15 | 9.6 |
|  |  | 3 | 6.5 | 5 | 16.8 |
|  |  | 4 | 7.0 | 4 | 18.9 |
|  |  | 5 | 7.0 | 4 | 19.1 |
| Fructose | Not added | 2 | 5.5 | 30< | 0.4 |
|  |  | 3 | 5.5 | 30< | 0.6 |
|  |  | 4 | 5.5 | 30< | 0.6 |
|  |  | 5 | 5.5 | 30< | 0.3 |
|  | Added | 2 | 6.0 | 30< | 2.1 |
|  |  | 3 | 7.0 | 9 | 7.1 |
|  |  | 4 | 7.2 | 6 | 8.8 |
|  |  | 5 | 7.0 | 6 | 9.7 |
| Mannose | Not added | 2 | 5.5 | 30< | 0 |
|  |  | 3 | 5.5 | 30< | 0.2 |
|  |  | 4 | 5.5 | 30< | 0.4 |
|  |  | 5 | 5.5 | 30< | 0.8 |
|  | Added | 2 | 6.0 | 30< | 2.1 |
|  |  | 3 | 7.0 | 13 | 3.7 |
|  |  | 4 | 7.0 | 6 | 8.9 |
|  |  | 5 | 7.0 | 5 | 10.3 |
|  | Not added | 2 | 6.0 | 30< | 0.2 |
|  |  | 3 | 5.5 | 30< | 0 |
|  |  | 4 | 5.5 | 30< | 0 |
|  |  | 5 | 5.5 | 30< | — |
| Galactose | Added | 2 | 5.5 | 20 | 2.7 |
|  |  | 3 | 5.5 | 19 | 3.3 |
|  |  | 4 | 5.5 | 19 | 2.5 |
|  |  | 5 | 5.5 | 30< | 1.2 |

*Example II*

Media were prepared using starch instead of monosaccharides as the carbon source in the medium of Example I. Three kinds of media, i.e., one containing no additional substance, one containing added phytic acid (0.01%), and one containing added inositol (0.01%) were prepared. Each of the three media was inoculated with *Aspergillus niger* NRRL 337 and cultured in the same manner as described in Example I. The results are shown in Table II below.

TABLE II

| Medium | Incubation Period, Hrs. | pH | Dextrinogenic Amylase Activity | Saccharogenic Amylase Activity | Milligrams of mycelium/10 ml. of broth |
|---|---|---|---|---|---|
| Basal medium only | 40 | 6.0 | 29< | 1.3 | 80 |
|  | 64 | 6.0 | 28< | 1.7 | 85 |
|  | 88 | 5.5 | 27< | 0.8 | 50 |
| Basal medium+Inositol | 40 | 6.0 | 29< | 1.3 | 70 |
|  | 64 | 6.0 | 18< | 0 | 85 |
|  | 88 | 5.5 | 27< | 0 | 75 |
| Basal medium +Phytic acid | 40 | 4.0 | 10 | 5.3 | 75 |
|  | 64 | 5.0 | 8 | 8.3 | 60 |
|  | 88 | 5.0 | 5 | 9.2 | 77 |

As is clearly shown in the above table, starch-hydrolyzing enzymes are produced in increased quantities only when phytic acid is added and not by inositol, which is related to phytic acid.

*Example III*

Media were prepared as described in Example II using starch as the carbon source, and 0.01% phytic acid. The flasks were then inoculated with three strains of molds; namely, *Aspergillus oryzae*, *Aspergillus awamori*, and *Rhizopus javanicus*, and culturing carried out in the same manner as described in Example I. The results obtained are shown in Table III below.

*Example IV*

A medium consisting of starch (2–5%), disodium hydrogen-phosphate (0.1%), calcium chloride (0.05%), and magnesium nitrate (0.05%) was prepared as described in the preceding example. However, as the nitrogen source, 0.5% each of yeast extract, peptone, and distillers dried solubles was substituted for the ammonium nitrate in each medium. Culturing was carried out in the same manner described in Example I, using *Aspergillus niger* NRRL 337.

The above media were compared with a medium containing ammonium ntirate (0.5%) as the nitrogen source.

TABLE III

| Microorganisms | Phytic Acid | Incubation Period, Days | pH | Dextrinogenic Amylase, Activity | Saccharogenic Amylase, Activity | Milligrams of Mycelium per 10 ml. of Broth | Sugar Consumed (percent) |
|---|---|---|---|---|---|---|---|
| Aspergillus oryzae | not added | 2 | 6.0 | 18 | 1.7 | 45 | 31.2 |
|  |  | 3 | 5.5 | 28 | 3.4 | 45 | 43.7 |
|  | added | 2 | 6.0 | 2 | 21.1 | 110 | 98.9 |
|  |  | 3 | 7.0 | 3 | 26.8 | 115 | 98.1 |
| Aspergillus awamori | not added | 2 | 5.0 | 18 | 1.9 | 50 | 72.5 |
|  |  | 3 | 5.5 | 33 | 1.3 | 35 | 92.9 |
|  | added | 2 | 6.0 | 10 | 8.5 | 125 | 98.9 |
|  |  | 3 | 7.0 | 5 | 18.7 | 99 | 97.4 |
| Rhizopus javanicus | not added | 3 | 5.0 | 33> | 0.6 | — | 62.2 |
|  |  | 2 | 5.0 | 32> | 0.4 | 50 | 70.3 |
|  | added | 2 | 5.0 | 32> | 0 | 32 | 74.8 |
|  |  | 3 | 5.0 | 33> | 2.6 | — | 99.0 |

Phytic acid (0.05%) was added as indicated. The results are shown in Table IV below.

TABLE IV

| Source of Nitrogen | Phytic Acid | Incubation Period, Days | pH | Dextrinogenic Amylase, Activity | Saccharogenic Amylase, Activity |
|---|---|---|---|---|---|
| Ammonium Nitrate | Not added | 2 | 5.5 | 30< | 1.21 |
|  |  | 3 | 5.5 | 30< | 0.65 |
|  |  | 4 | 5.5 | 30< | 0 |
|  |  | 5 | 5.0 | 30< | --- |
| Do | Added | 2 | 5.2 | 4 | 25.3 |
|  |  | 3 | 5.5 | 2 | 29.9 |
|  |  | 4 | --- | 3 | 19.5 |
|  |  | 5 | 5.5 | --- | --- |
| Yeast Extract | Not added | 2 | 7.5 | 30< | 1.1 |
|  |  | 3 | 7.5 | 14 | 2.3 |
|  |  | 4 | 7.5 | 15 | 3.3 |
|  |  | 5 | 7.5 | 9 | 4.7 |
| Peptone | do | 2 | 6.5 | 30< | 1.3 |
|  |  | 3 | 5.5 | 30< | 1.4 |
|  |  | 4 | 5.5 | 19 | 2.3 |
|  |  | 5 | 5.5 | 14 | 5.2 |
| Distillers' Dried Solubles | do | 2 | 5.5 | 16 | 5.6 |
|  |  | 3 | 5.0 | 8 | 6.6 |
|  |  | 4 | 5.5 | 12 | 7.8 |
|  |  | 5 | 5.5 | 9 | 9.3 |

From the above table, it is clear that the addition of a trace of phytic acid to a medium containing a simple inorganic salt such as ammonium nitrate as the nitrogen source leads to more advantageous production of starch-hydrolyzing enzymes than the use of some organic nitrogen sources, and therefore, that the use of phytic acid is economically of high efficiency.

Now having described my invention, what I claim is:

1. In a process for the production of starch-hydrolyzing enzymes selected from the group consisting of dextrinogenic amylase and saccharogenic amylase by the fermentation of a nutrient medium with an enzyme-producing microorganism selected from the group consisting of dextrinogenic amylase-producing microorganisms and saccharogenic amylase-producing microorganisms, the improvement which consists of incorporating in said nutrient medium a material selected from the group consisting of phytic acid and non-toxic salts of phytic acid in amounts sufficient to improve the yields of said starch-hydrolyzing enzymes.

2. The process of claim 1 wherein the nutrient medium contains a source of carbon selected from the group consisting of monosaccharides and disaccharides.

3. The process of claim 1 wherein the nutrient medium contains starch as a carbon source.

4. The process of claim 1 wherein the nutrient medium contains glucose as a source of carbon.

5. The process of claim 1 wherein the fermentation is carried out at a temperature of approximately 30° C. for 2–4 days using an enzyme-producing filamentous fungi selected from the group consisting of dextrinogenic amylase-producing filamentous fungi and saccharogenic-amylase-producing filamentous fungi.

6. The process of claim 1 wherein the fermentation is carried out at a temperature of about 37° C. for 1–3 days' time using an enzyme-producing bacterium selected from the group consisting of dextrinogenic amylase-producing bacteria and saccharogenic amylase-producing bacteria.

7. The process of claim 1 wherein the fermentation is carried out with a mold selected from the group consisting of *Aspergillus niger, Aspergillus oryzae, Aspergillus awamori,* and *Rhizopus javanicus.*

8. The process of claim 1 wherein from 0.01% to 0.1% of a material selected from the group consisting of phytic acid and non-toxic salts of phytic acid are included in said medium.

References Cited in the file of this patent

Proc. Int. Symposium on Enzyme Chemistry, Tokyo and Kyoto, 1957, Weda, pages 491 to 494; Okazaki, pages 494 to 499.